(12) United States Patent
Ramalingam

(10) Patent No.: US 8,856,932 B2
(45) Date of Patent: *Oct. 7, 2014

(54) ROOTKIT MONITORING AGENT BUILT INTO AN OPERATING SYSTEM KERNEL

(71) Applicant: International Business Machines Corporation, Armonk, NY (US)

(72) Inventor: Jayakrishnan Ramalingam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/959,168

(22) Filed: Aug. 5, 2013

(65) Prior Publication Data

US 2013/0318612 A1 Nov. 28, 2013

Related U.S. Application Data

(63) Continuation of application No. 12/871,103, filed on Aug. 30, 2010, now Pat. No. 8,539,584.

(51) Int. Cl.
 G06F 21/56 (2013.01)
 G06F 12/14 (2006.01)
 G06F 21/52 (2013.01)
 G06F 21/55 (2013.01)

(52) U.S. Cl.
 CPC ........... *G06F 21/56* (2013.01); *G06F 21/52* (2013.01); *G06F 21/554* (2013.01)
 USPC ............. 726/24; 726/22; 726/23; 713/187; 713/188

(58) Field of Classification Search
 None
 See application file for complete search history.

(56) References Cited

U.S. PATENT DOCUMENTS

| 7,571,482 B2 | 8/2009 | Polyakov et al. |
| 7,802,300 B1 * | 9/2010 | Liu et al. ................... 726/23 |
| 8,225,405 B1 | 7/2012 | Peterson et al. |

(Continued)

FOREIGN PATENT DOCUMENTS

CN 101042719 A 9/2007

OTHER PUBLICATIONS

AntiHook: Host Intrusion Prevention System by Info Process Pty Ltd.; Aug. 29, 2006; 13 pages.

(Continued)

*Primary Examiner* — Jung Kim
*Assistant Examiner* — Adrian Stoica
(74) *Attorney, Agent, or Firm* — Schmeiser, Olsen & Watts; John Pivnichny (57) ABSTRACT

An approach for detecting a kernel-level rootkit is presented. A changed entry in a System Service Descriptor Table (SSDT) or an Interrupt Descriptor Table (IDT) is detected. The changed entry results from an installation of suspect software. The changed entry is determined to be not referenced by a white list. A black list is updated to reference the changed entry to indicate the changed entry results from an installation of the kernel-level rootkit. The suspect software is determined to be the kernel-level rootkit based on the changed entry not being referenced by the white list. The changed entry is restored to an entry included in a first state of an operating system kernel. The first state is based on the SSDT and IDT referencing hooks indicated in the white list, where the hooks are not the result of an installation of any kernel-level rootkit.

19 Claims, 4 Drawing Sheets

(56) References Cited

U.S. PATENT DOCUMENTS

| | | | |
|---|---|---|---|
| 2005/0229250 | A1 | 10/2005 | Ring et al. |
| 2006/0288420 | A1* | 12/2006 | Mantripragada et al. ....... 726/25 |
| 2007/0283192 | A1 | 12/2007 | Shevchenko |
| 2007/0289015 | A1 | 12/2007 | Repasi et al. |
| 2008/0015808 | A1 | 1/2008 | Wilson et al. |
| 2008/0034429 | A1 | 2/2008 | Schneider |
| 2008/0127114 | A1 | 5/2008 | Vasudevan |
| 2009/0064329 | A1 | 3/2009 | Okumura et al. |
| 2009/0205045 | A1 | 8/2009 | Horvath et al. |
| 2009/0217377 | A1 | 8/2009 | Arbaugh et al. |
| 2010/0100963 | A1* | 4/2010 | Mahaffey .................... 726/25 |
| 2011/0320797 | A1 | 12/2011 | Wilson et al. |
| 2012/0054868 | A1 | 3/2012 | Ramalingam |

OTHER PUBLICATIONS

Andrew Conry-Murray; Rootkit Detection: Finding the Enemy Within. [online]. 4 pages. [retrieved on Apr. 23, 2010]. Retrieved from the Internet:< URL: http://www.eetimes.com/showArticle.jhtml?articleID=196500101 >.

Vasisht, Vikas R. and Lee, Hsien-Hsin S.; Shark: Architectural Support for Autonomic Protection Against Stealth by Rootkit Exploits; 2008; 11 pages.

Antivirus Software for Windows Server. [on-line]. 14 pages. [retrieved on May 18, 2010]. Retrieved from the Internet: < URL: http://74.125.153.132/search?q=cache:21deQ3_1gfEJ:www.avast.com/server-edition+%28loading+OR+inserting+OR+built-in+OR+in-built%29%28rootkit%29+%28software+OR+application+OR+program+OR+code+OR+script%29+%28RAM+OR+ROM%29+when+the+operating+system+is+booting&cd=3&hl=en&ct=cInk&gl=in >.

Office Action (Mail Date Aug. 8, 2012) for U.S. Appl. No. 12/871,103, filed Aug. 30, 2010.

Amendment filed Nov. 8, 2012 in response to Office Action (Mail Date Aug. 8, 2012) for U.S. Appl. No. 12/871,103, filed Aug. 30, 2010.

Final Office Action (Mail Date Dec. 13, 2012) for U.S. Appl. No. 12/871,103, filed Aug. 30, 2010.

Amendment and Request for Continued Examination filed Mar. 21, 2013 in response to Office Action (Mail Date Aug. 8, 2012) for U.S. Appl. No. 12/871,103, filed Aug. 30, 2010.

Notice of Allowance (Mail Date May 10, 2013) for U.S. Appl. No. 12/871,103, filed Aug. 30, 2010.

Wampler, Douglas Ray; Methods for Detecting Kernel Rootkits; Dec. 2007; A Dissertation Submitted to the Faculty of the Graduate School of the University of Louisville in Partial Fulfillment of the Requirements for the Degree of Doctor of Philosophy; University of Louisville, Kentucky; pp. 6-29.

* cited by examiner

ROOTKIT MONITORING AGENT BUILT INTO AN OPERATING SYSTEM KERNEL

This application is a continuation application claiming priority to Ser. No. 12/871,103 filed Aug. 30, 2010, now U.S. Pat. No. 8,539,584, issued Sep. 17, 2013.

TECHNICAL FIELD

The present invention relates to a data processing method and system for detecting malicious software, and more particularly to a technique that detects rootkits executing in an operating system kernel.

BACKGROUND

A rootkit is malicious software used to install and hide other malicious programs inside a computer system. Rootkits are programmed so that is very difficult to detect the rootkits through standard anti-virus or anti-spyware scans on the operating system. A rootkit can be categorized as one of the following five types depending upon the location in the computer system in which the rootkit executes: (1) firmware, (2) hypervisor, (3) kernel, (4) library, and (5) application. As one example, a kernel-level rootkit adds additional code or replaces portions of an operating system, including both the kernel and associated device drivers. Most operating systems support kernel-mode device drivers that execute with the same privileges as the operating system itself. As such, many kernel-level rootkits are developed as device drivers or loadable kernel modules. Code added or replaced by a kernel-level rootkit may have serious impacts on the stability of the entire computer system if bugs are present in the code. Because kernel-level rootkits operate at the same security level as the operating system itself, they are able to intercept or subvert operations performed by the operating system, including operations of anti-virus software running on the compromised system. Known techniques for detecting and preventing rootkits degrade system performance and have limited detection and prevention capabilities because they operate only at later stages of the booting of the operating system. Furthermore, because known kernel-level rootkit detection and prevention tools are provided by third parties and reside outside the operating system, a customer who is purchasing an operating system and wants detection and prevention of rootkits is subject to the separate costs of the operating system's purchase price and a licensing fee for the third party's rootkit detection and prevention tool. Thus, there exists a need to overcome at least one of the preceding deficiencies and limitations of the related art.

BRIEF SUMMARY

Embodiments of the present invention provide a computer-implemented method of detecting a kernel-level rootkit. The method comprises:

a rootkit monitoring agent (RMA) storing a first state of data structures of a kernel of an operating system of a computer system, the data structures including a System Service Descriptor Table (SSDT) and an Interrupt Descriptor Table (IDT), the first state based on the SSDT and the IDT referencing a first plurality of hooks indicated in a white list and that are not the result of any kernel-level rootkit being installed on the computer system, and the first state including an entry of the SSDT or the IDT, wherein the RMA is built into the operating system and is activated as a kernel process of the kernel subsequent to an initialization of the operating system by the computer system;

the RMA monitoring the SSDT and the IDT and in response to monitoring the SSDT and the IDT, detecting a changed entry in the SSDT or the IDT, wherein the changed entry results from a change to the entry, the change resulting from an installation of suspect software in the computer system;

the RMA identifying the changed entry as being unauthorized based on the change to the entry indicating a hook that is code, a software application, or a software module that is not indicated by the white list;

the RMA determining the suspect software is the kernel-level rootkit based on the detected changed entry being identified as unauthorized;

responsive to determining the suspect software is the kernel-level rootkit, the RMA restoring the changed entry to the entry included in the first state; and the RMA updating a black list to reference the hook indicated by the change to the entry, wherein the black list references a second plurality of hooks that result from installations of kernel-level rootkits on the computer system.

A system, program product and a process for supporting computing infrastructure corresponding to the above-summarized method are also described and claimed herein.

Embodiments of the present invention provide a new component built inside any operating system kernel and that runs inside kernel space memory to monitor operating system data structures to detect unauthorized changes by kernel-based rootkits and to prevent subsequent negative effects of the unauthorized changes.

DETAILED DESCRIPTION

Overview

Embodiments of the present invention provide a software agent (hereinafter referred to as the Rootkit Monitoring Agent or RMA) embedded in a kernel of any operating system. The RMA detects and prevents effects (e.g., attacks) of kernel-level rootkits (i.e., rootkits that execute in an operating system kernel; a.k.a. kernel-based rootkits) by monitoring changes to entries in kernel data structures such as the System Service Descriptor Table (SSDT) and the Interrupt Descriptor Table (IDT). The RMA may become active in response to the operating system kernel being loaded into the main memory by the boot-loader program that resides in the boot-sector of the disk. After detecting an unauthorized change to a kernel data structure entry, the RMA restores the changed entry to a previously stored state that is known to be a state unaffected by a kernel-level rootkit. The RMA also stores the changed entry to a black list that may be used to subsequently block further action by the detected kernel-level rootkit and subsequently block another kernel-level rootkit from providing the same change to a kernel data structure entry.

System for Detecting and Preventing Effects of Rootkits

Figure 1:
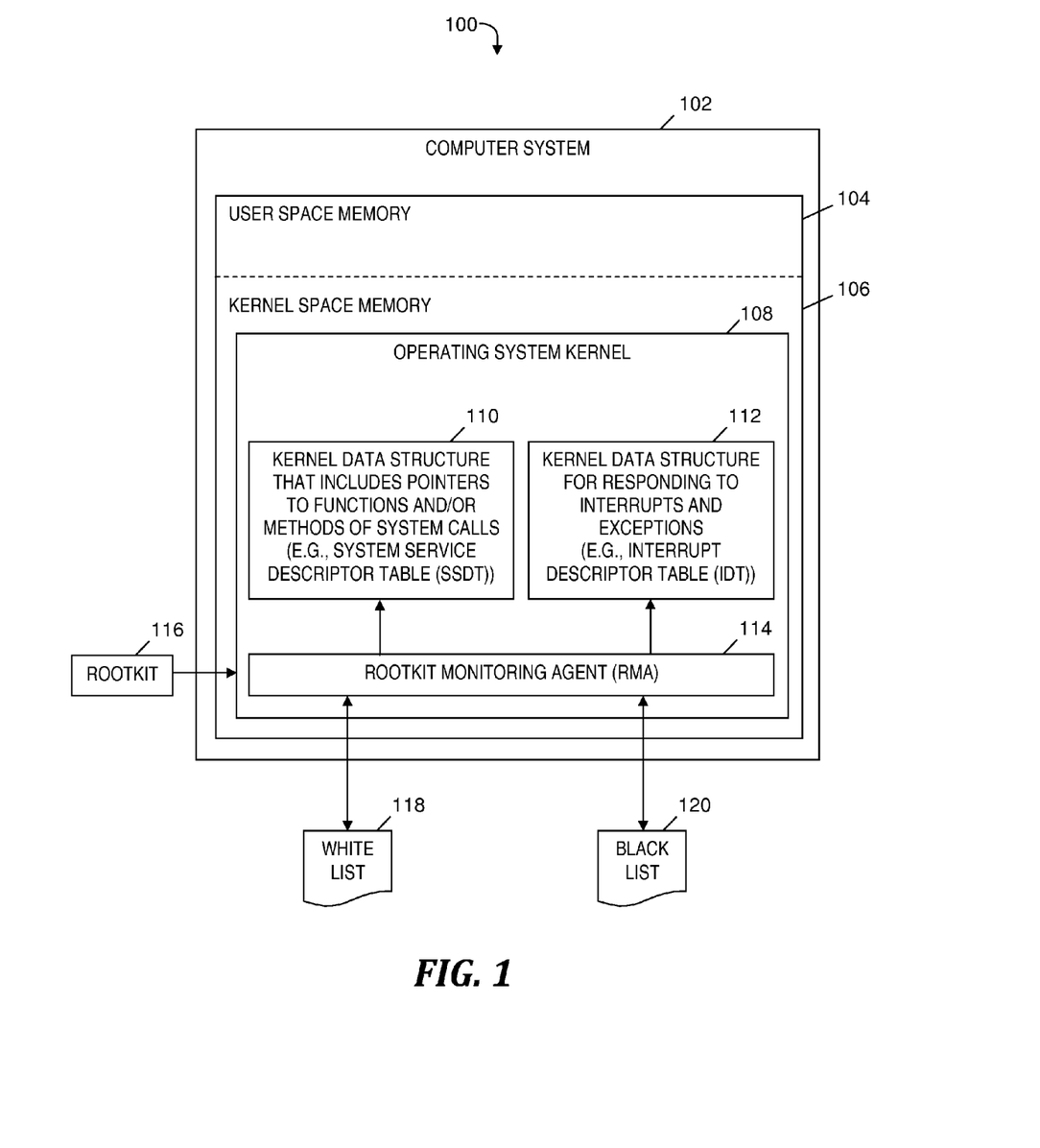
FIG. 1 is a block diagram of a system for detecting kernel-level rootkits by a rootkit monitoring agent built into an operating system kernel, in accordance with embodiments of the present invention.

FIG. 1 is a block diagram of a system for detecting rootkits by a rootkit monitoring agent built into an operating system kernel, in accordance with embodiments of the present invention. System 100 includes a computer system 102 that includes a user space memory 104 and a kernel space memory 106. Kernel space memory 106 includes an operating system kernel 108 (i.e., a kernel of an operating system of computer system 102) that includes a first kernel data structure 110 and a second kernel data structure 112. First kernel data structure 110 is a data structure of operating system kernel 108 that includes pointers to software applications and/or pointers to software modules (e.g., functions and/or methods) of system calls. Second kernel data structure 112 is a data structure of operating system kernel 108 that includes pointers to software applications and/or pointers to software modules called as a response to hardware interrupts, software interrupts, and exceptions. In one embodiment, first kernel data structure 110 is a System Service Descriptor Table (SSDT) and second kernel data structure 112 is an Interrupt Descriptor Table (IDT).

Operating system kernel 108 also includes a rootkit monitoring agent (RMA) 114 that monitors the first and second kernel data structures 110, 112 and detects changes made to the kernel data structures 110, 112 (e.g., by the installation of software such as a kernel-level rootkit 116). That is, RMA 114 is built into (i.e., embedded in) operating system kernel 108. Rootkit 116 is executed by operating system kernel 108 and RMA 114 detects change(s) to one or more entries in first kernel data structure 110 and/or one or more entries in second kernel data structure 112. The detected change(s) are caused by the execution of rootkit 116. RMA 114 compares the detected change(s) to entries in a white list 118 (a.k.a. whitelist) and a black list 120 (a.k.a. blacklist). RMA 114 determines that the detected change(s) are unauthorized and places the change(s) in black list 120 to block a subsequent attempt by a rootkit to make the same change(s) to data structure 110 and/or data structure 112. The functionality of the components of FIG. 1 is discussed further below relative to FIG. 2 and FIG. 3.

Initial values of white list 118 and black list 120 may be determined during an operating system design stage by a kernel designer who knows a list of predefined entries in the kernel data structures 110 and 112. Initial values of white list 118 and black list 120 may then be augmented through intelligence gathering (i.e., behavior analysis) by running a wide range of applications and tools on the kernel.

Process for Detecting and Preventing Effects of Rootkits

Figure 2:
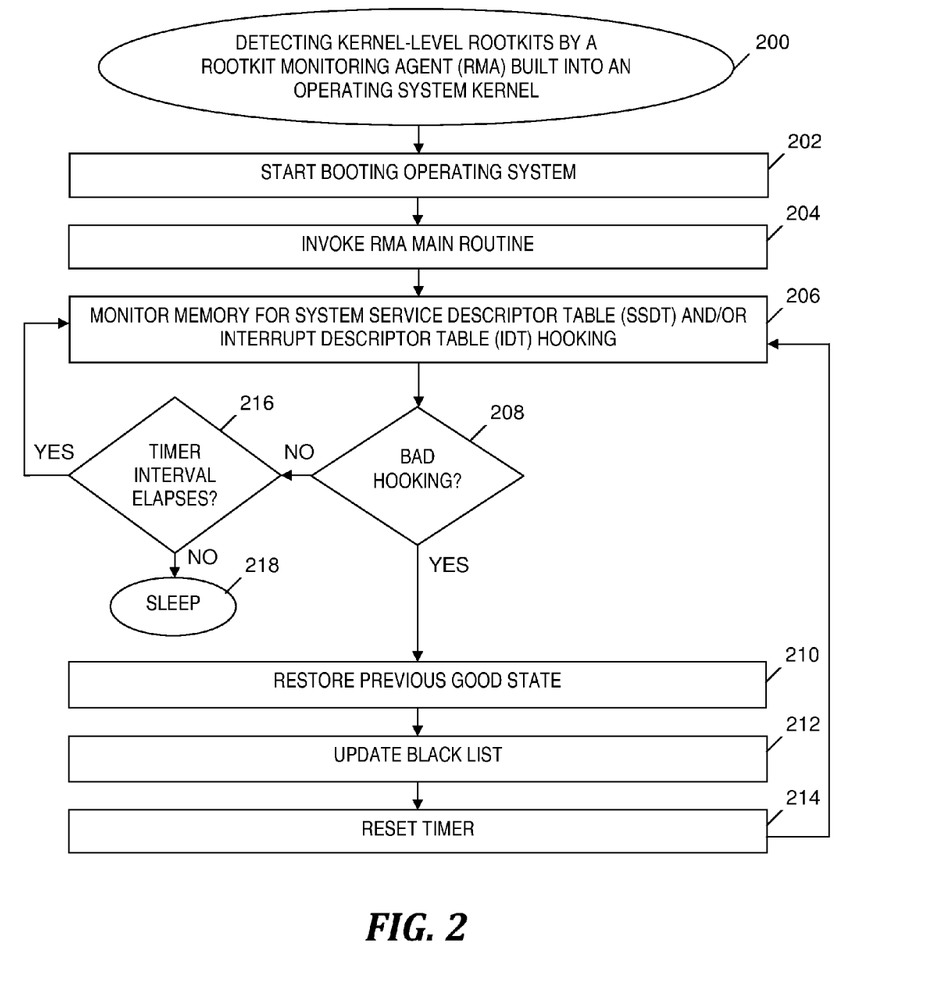
FIG. 2 is a flowchart of a process for detecting kernel-level rootkits by a rootkit monitoring agent built into an operating system kernel, where the process is implemented by the system of FIG. 1, in accordance with embodiments of the present invention.

FIG. 2 is a flowchart of a process for detecting rootkits by a rootkit monitoring agent built into an operating system kernel, where the process is implemented by the system of FIG. 1, in accordance with embodiments of the present invention. At step 200, the process begins for detecting kernel-level rootkits by RMA 114 (see FIG. 1), which is built into an operating system kernel. In the description of FIG. 2 that follows, references to "SSDT" and "IDT" indicate one embodiment and may be replaced with references to first and second kernel data structures 110 and 112 (see FIG. 1), respectively, to describe one or more other embodiments.

In step 202, computer system 102 initiates a booting of an operating system of the computer system 102 (see FIG. 1). In step 204, computer system 102 (see FIG. 1) invokes a main routine of RMA 114 (see FIG. 1) as a kernel process. In one embodiment, step 204 is performed by calling the main routine of RMA 114 (see FIG. 1) from the initialization routine (e.g., the init process) included in the booting of the operating system of computer system 102 (see FIG. 1), where the call to the main routine of the RMA is performed after the operating system is initialized. That is, the RMA becomes active as any other kernel service in, for example, a Linux or Unix operating system.

In response to invoking the main routine of RMA 114 (see FIG. 1), the RMA monitors kernel space memory 106 (see FIG. 1) and determines the starting address and size of the SSDT and the starting address and size of the IDT. Periodically (e.g., every x seconds as determined by a timer), RMA 114 (see FIG. 1) stores a known good state of the SSDT and the IDT. As used herein, a known good state of the SSDT and the IDT is defined as a state in which the entries of the SSDT and the IDT are known by computer system 102 (see FIG. 1) to not include a reference to any code, software application or software module resulting from an installation of a kernel-level rootkit on computer system 102 (see FIG. 1). The entries (i.e., "good" entries) of the SSDT and the IDT that are in the known good state are stored by the RMA 114 (see FIG. 1) in white list 118 (see FIG. 1). In one embodiment, RMA 114 (see FIG. 1) generates normalized hash values of the code, software applications and/or software modules to which the good entries of the SSDT and the IDT point, and stores the normalized hash values in white list 118 (see FIG. 1). The normalized hash values may be computed by a Secure Hash Algorithm (SHA), such as the SHA-256 Algorithm.

In step 206, RMA 114 (see FIG. 1) monitors kernel space memory 106 (see FIG. 1) for hooking to the SSDT and/or the IDT and detects a hook to the SSDT or the IDT. As used herein, a hook is defined as code, a software application or a software module that is referenced by a pointer included in an entry of a kernel data structure. Detecting a hook to the SSDT includes detecting code, a software application or a software module referenced by a pointer in an entry of the SSDT, where the entry is added to or changed in the SSDT as a result of executing software in operating system kernel 108 (see FIG. 1). Similarly, detecting a hook to the IDT includes detecting code, a software application or a software module referenced by a pointer in an entry of the IDT, where the entry is added to or changed in the IDT as a result of executing software in operating system kernel 108 (see FIG. 1).

Step 206 is performed periodically in response to a predefined time interval elapsing as determined by a timer included in computer system 102 (see FIG. 1). The predefined time interval may be specified in computer system 102 (see FIG. 1) prior to step 202. In one embodiment, the predefined time interval is 1 second, which may provide for optimal monitoring of the SSDT and IDT.

In step 208, RMA 114 (see FIG. 1) determines whether the hook detected in step 206 is a result of bad hooking or good hooking (i.e., whether the hook detected in step 206 is a bad hook or a good hook). As used herein, a bad hook is defined as a hook that is referenced in black list 120 (see FIG. 1) and/or is not referenced in white list 118 (see FIG. 1). A hook that is not referenced in white list 118 (see FIG. 1) may result from an installation of a kernel-level rootkit (e.g., rootkit 116 in FIG. 1) or from executing a software application or module whose status as a kernel-level rootkit is unknown. As used herein, a good hook is defined as a hook that is referenced in white list 118 (see FIG. 1). If step 208 determines that the hook detected in step 206 is a bad hook, then the Yes branch of step 208 is taken and step 210 is performed.

In step 210, RMA 114 (see FIG. 1) restores the kernel data structure entry that references the bad hook to a good state determined prior to step 208. The good state determined prior to step 208 is a state in which the entries of the SSDT and IDT are known by computer system 102 (see FIG. 1) to not reference any code, software application and/or software module provided by a kernel-level rootkit. The kernel data structure entry restored in step 210 references code, a software application or a software module that is referenced in white list 118 (see FIG. 1).

In step 212, RMA 114 (see FIG. 1) updates black list 120 (see FIG. 1) by including a reference to the bad hook determined in step 208. In one embodiment, RMA 114 (see FIG. 1) generates a normalized hash value referencing the bad hook and stores the generated normalized hash value in black list 120 (see FIG. 1). The normalized hash value may be computed by a Secure Hash Algorithm, such as the SHA-256 Algorithm.

Step 212 also includes RMA 114 (see FIG. 1) blocking further action by the kernel-level rootkit (e.g., rootkit 116 in FIG. 1) that provided the bad hook detected in step 208. In step 214, computer system 102 (see FIG. 1) resets the timer for determining when the predefined time interval elapses for periodic monitoring of the SSDT and IDT (i.e., iterative performances of step 206). After resetting the timer in step 214, the process of FIG. 2 repeats starting at step 206.

Returning to step 208, if RMA 114 (see FIG. 1) determines that the hook determined in step 206 is a good hook, then the No branch of step 208 is taken and step 216 is performed. In step 216, computer system 102 (see FIG. 1) determines if the aforementioned timer determines that the predefined time interval has elapsed. If step 216 determines that the predefined time interval has elapsed, then the Yes branch of step 216 is taken and the process of FIG. 2 repeats starting at step 206; otherwise, the process of FIG. 2 enters a sleep mode in step 218. Although not shown in FIG. 2, the process of FIG. 2 returns to step 206 from the sleep mode (see step 218) in response to the aforementioned timer determining that the predefined time interval has elapsed.

SSDT Monitoring

In one embodiment, the RMA 114 (see FIG. 1) performs the following steps to monitor the SSDT and prevent attacks by kernel-level rootkits:

1) Wait for the initialization of the SSDT to happen.
2) Obtain the SSDT count.
3) Set up write triggers for every SSDT entry (see Install SSDT Handlers 306 in FIG. 3).
4) Make a copy of the entire SSDT (i.e., a known good state of the SSDT) for restoring entries to a good state if needed based on an analysis of modified entries.
5) Create a first data structure for keeping track of the location and size of the SSDT.
6) Initialize and start memory monitors for each SSDT entry (see step 206 in FIG. 2 and SSDT Monitor 304 in FIG. 3).
7) Create a second data structure for keeping track of modified SSDT entries
8) Check modified SSDT entries against white list 118 (see FIG. 1) (see step 208 in FIG. 2)
9) If modified SSDT entry is bad, restore SSDT entry to previously stored good state using the entry number (see step 210 in FIG. 2).

IDT Monitoring

In one embodiment, the RMA 114 (see FIG. 1) performs the following steps to monitor the IDT and prevent attacks by kernel-level rootkits:

1) In response to initializing the IDT, obtain the address of the IDT.
2) Set up write triggers for every IDT entry (see Install IDT Handlers 314 in FIG. 3).
3) Make a copy of the entire IDT (i.e., a known good state of the IDT) for restoring entries to a good state if needed based on an analysis of modified entries.
4) Create a first data structure for keeping track of the location and size of the IDT.
5) Initialize and start memory monitors for each IDT entry (see step 206 in FIG. 2 and IDT Monitor 312 in FIG. 3).
6) Create a second data structure for keeping track of modified IDT entries
7) Check modified IDT entries against white list 118 (see FIG. 1) (see step 208 in FIG. 2)
8) If modified IDT entry is bad, restore IDT entry to previously stored good state using the entry number (see step 210 in FIG. 2).

Rootkit Monitoring Agent

Figure 3:
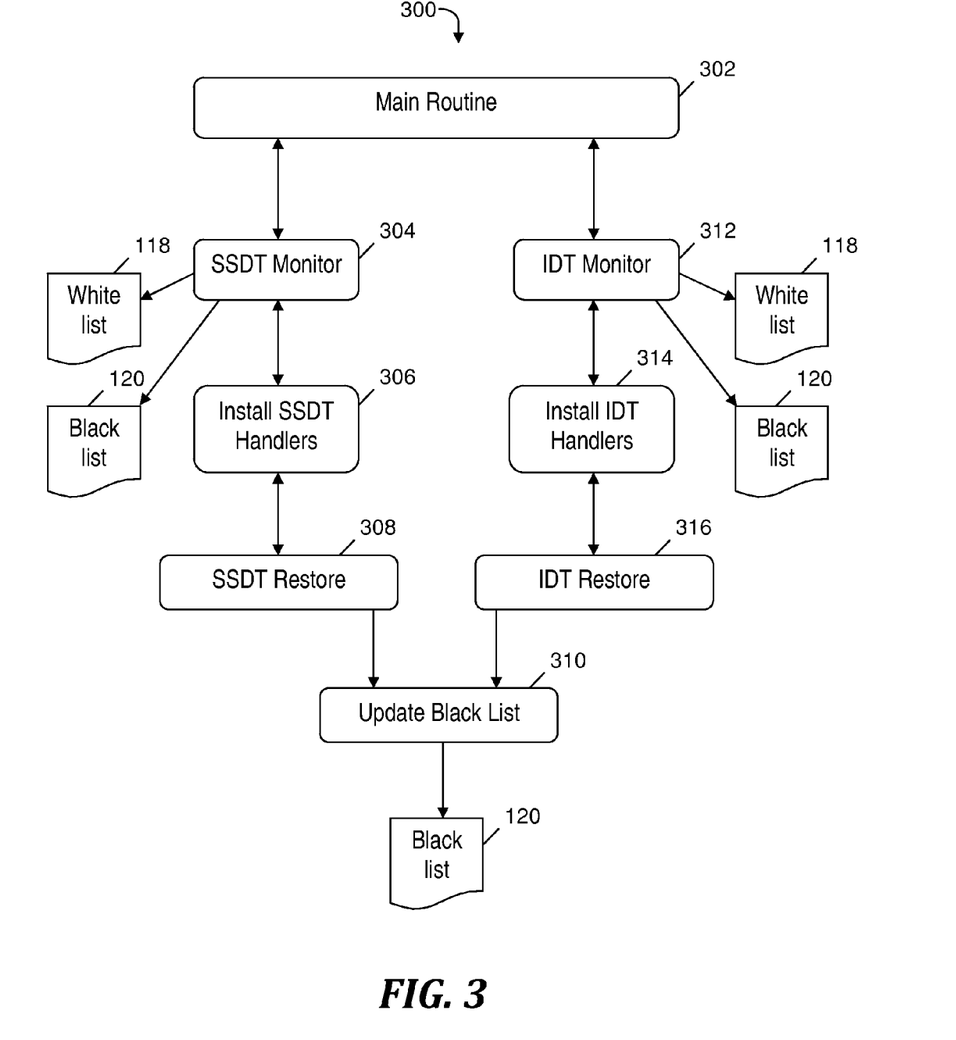
FIG. 3 is a component diagram of the rootkit monitoring agent included in the system of FIG. 1, in accordance with embodiments of the present invention.

FIG. 3 is a component diagram of the rootkit monitoring agent included in the system of FIG. 1, in accordance with embodiments of the present invention. Component diagram 300 depicts the following components (i.e., software modules) of RMA 114 (see FIG. 1): Main Routine 302, SSDT Monitor 304, Install SSDT Handlers 306, SSDT Restore 308, Update Black List 310, IDT Monitor 312, Install IDT Handlers 314, and IDT Restore 316. The particular names of the components in diagram 300 are examples only and the present invention contemplates that the components may be implemented with modules having other names.

Main Routine 302 is the entry point to RMA 114 (see FIG. 1). Initialization modules of the operating system of computer system 102 (see FIG. 1) invoke Main Routine 302 in response to the operating system being initialized. Step 204 (see FIG. 2) may include the invocation of Main Routine 302.

SSDT Monitor 304 monitors kernel space memory 106 (see FIG. 1) for SSDT hooking by software applications and rootkits. SSDT Monitor 304 detects hooks to the SSDT and may identify a detected hook as a good hook based on the detected hook being referenced in whitelist 118 or as a bad hook based on the detected hook being referenced in blacklist 120 or being not referenced in whitelist 118.

Install SSDT Handlers 306 installs monitor functions (i.e., call back functions) for each of the entries in the SSDT. The installed call back functions are executed in response to a corresponding entry in the SSDT being invoked or hooked by a software application or rootkit.

SSDT Restore 308 stores a known good state of the SSDT in main memory or in a file system residing in a computer data storage unit. The known good state may be stored in encrypted form. SSDT Restore 308 also restores SSDT entries to their previously stored good states if the entries are modified by unknown applications or rootkits. SSDT Restore 308 blocks rootkits detected by SSDT Monitor 304 from hooking again into the SSDT and calls Update Black List 310 to update entries in blacklist 120 with references to code, software applications and modules that execute as a result of attacks by the detected rootkits.

IDT Monitor 312 monitors kernel space memory 106 (see FIG. 1) for IDT hooking by software applications and rootkits. IDT Monitor 312 detects hooks to the IDT and may identify a detected hook as a good hook based on the detected hook being referenced in whitelist 118 or as a bad hook based on the detected hook being referenced in blacklist 120 or being not referenced in whitelist 118.

Install IDT Handlers 314 installs monitor functions (i.e., call back functions) for each of the entries in the IDT. The installed call back functions are executed in response to a corresponding entry in the IDT being invoked or hooked by a software application or rootkit.

IDT Restore 316 stores a known good state of the IDT in main memory or in a file system residing in a computer data storage unit. The known good state may be stored in encrypted form. IDT Restore 316 also restores IDT entries to their previously stored good states if the entries are modified by unknown applications or rootkits. IDT Restore 316 blocks rootkits detected by IDT Monitor 312 from hooking again into the IDT and calls Update Black List 310 to update entries in blacklist 120 with references to code, software applications and modules that execute as a result of attacks by the detected rootkits.

Figure 4:
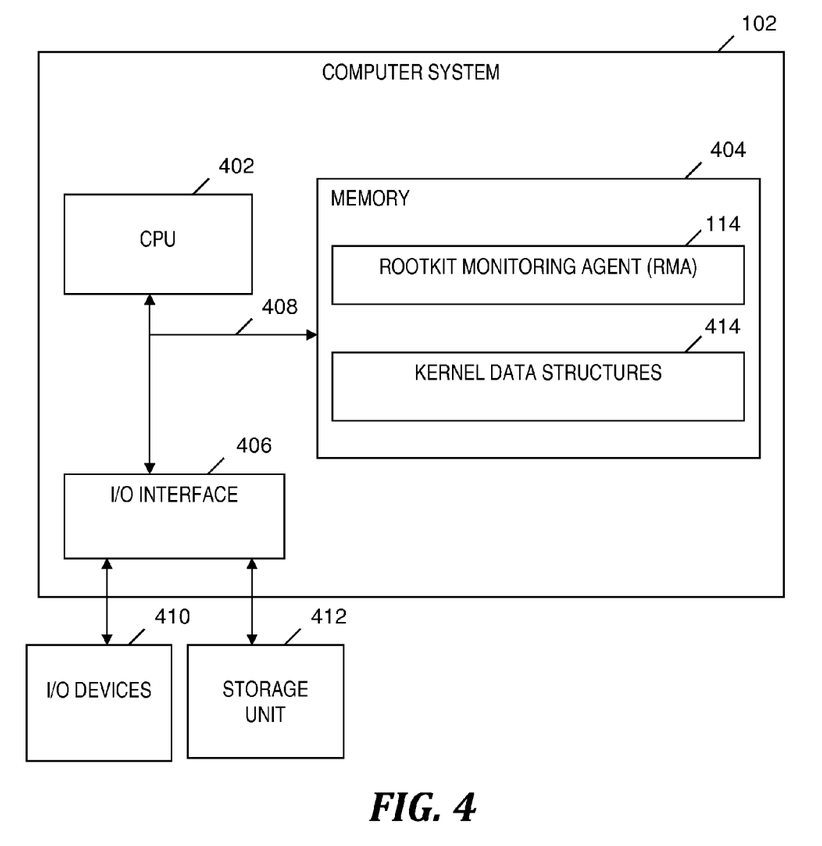
FIG. 4 is a block diagram of a computer system that is included in the system of FIG. 1 and that implements the process of FIG. 2, in accordance with embodiments of the present invention.

In one embodiment, whitelist 118 is a computer data file that includes hash values of applications and/or kernel modules that are determined to be genuine (i.e., not rootkits) and that hook into SSDT and IDT. As one example, whitelist file 118 may include the following entries:

SHA256, 052afe9a7e776d037a62ec0594f887cc467c86609bf0-7006f8c7e22c43132a28,2, Windows,XP,SP3,32, USER,ssdt,026,N,Y, \WINDOWS\system32\myapp.exe,Windows, SHA256, d76bbd14926ae40d6a770642597f320ebfc1438879-41bd02073c86256b8a2960,2, Linux,RHEL,5,32, USER,ssdt,060,N,Y,/myappmodule,kernel, In one embodiment, blacklist 120 is a computer data file that includes hash values of rootkits, unknown software modules, and unknown software applications that hook into the SSDT and the IDT. As one example, blacklist file 120 may include the following entries:

SHA256, 054afe6a7e776d037a62ec0594f887cc467c86609bf0-7006f8c7e22c43132a28,2, Windows,XP,SP3,32,SYSTEM,ssdt,023,N,M, \WINDOWS\system32\rootkit1.exe,Windows, SHA256, d76bbd16926ae40d6a770642597f320ebfc14388794-1bd02073c86256b8a2960,2, Linux,RHEL,5,32,USER, ssdt,060,N,Y,/rootkit3,kernel, Computer System FIG. 4 is a block diagram of a computer system that includes the system of FIG. 1 and that implements the process of FIG. 2, in accordance with embodiments of the present invention. Computer system 102 generally comprises a central processing unit (CPU) 402, a memory 404, an I/O interface 406, and a bus 408. Further, computer system 102 is coupled to I/O devices 410 and a computer data storage unit 412. CPU 402 performs computation and control functions of computer system 102. CPU 402 may comprise a single processing unit, or be distributed across one or more processing units in one or more locations (e.g., on a client and server). In one embodiment, CPU 402 is implemented as hardware.

Memory 404 may comprise any known computer readable storage medium, which is described below. In one embodiment, cache memory elements of memory 404 provide temporary storage of at least some program code (e.g., program code of rootkit monitoring agent 114) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store and retrieve information (e.g., data or program instructions such as program code of RMA 114) from an auxiliary storage device such as computer data storage unit 412 or another computer data storage unit (not shown). Computer data storage unit 412 may comprise any known computer readable storage medium, which is described below. For example, computer data storage unit 412 may be a non-volatile computer data storage device, such as a magnetic disk drive (i.e., hard disk drive) or an optical disc drive (e.g., a CD-ROM drive which receives a CD-ROM disk).

Memory 404 may store computer program code 114 that provides the logic for a process of detecting kernel-level rootkits by rootkit monitoring agent 114 built into an operating system kernel 108 (see FIG. 1). The aforementioned process of detecting kernel-level rootkits is included in the process in FIG. 2. Further, memory 404 may include other systems not shown in FIG. 4, such as an operating system (e.g., Linux) that runs on CPU 402 and provides control of various components within and/or connected to computer system 102. Memory 404 also may include user space memory 104 (see FIG. 1), kernel space memory 106 (see FIG. 1), and operating system kernel 108 (see FIG. 1). In one embodiment, white list 118 (see FIG. 1) and black list 120 (see FIG. 1) are stored in memory 404. In another embodiment, white list 118 (see FIG. 1) and black list 120 (see FIG. 1) are stored in a computer data storage unit coupled to computer system 102 (e.g., storage unit 412). In yet another embodiment, one of white list 118 (see FIG. 1) and black list 120 (see FIG. 1) is stored in memory 404 and the other is stored in a computer data storage unit coupled to computer system 102 (e.g., storage unit 412).

In addition to white list 118 (see FIG. 1) and/or black list 120 (see FIG. 1), memory 404 may also store, for example, a copy of a good state of kernel data structures 110 and 112 (see FIG. 1), a first data structure for keeping track of the location and size of kernel data structures 110 and 112 (see FIG. 1), and/or a second data structure for keeping track of modified entries in kernel data structures 110 and 112 (see FIG. 1).

Storage unit 412 and/or one or more other computer data storage units (not shown) that are coupled to computer system 102 may store data used, generated and/or provided by the process of FIG. 2. For example, storage unit 412 and/or one or more other computer data storage units coupled to computer system 102 may store entries in white list 118 (see FIG. 1), entries in black list 120 (see FIG. 1), copies of a good state of kernel data structures 110 and 112 (see FIG. 1), a first data structure for keeping track of the location and size of kernel data structures 110 and 112 (see FIG. 1), and/or a second data structure for keeping track of modified entries in kernel data structures 110 and 112 (see FIG. 1).

As will be appreciated by one skilled in the art, the present invention may be embodied as a system, method or computer program product. Accordingly, an aspect of an embodiment of the present invention may take a form that is entirely hardware, a form that is entirely software (including firmware, resident software, micro-code, etc.), or a form that is a combination of software and hardware, where the aforementioned aspect may generally be referred to herein as a "circuit" or "module." Furthermore, an embodiment of the present invention may take the form of a computer program product embodied in one or more computer readable medium (s) (e.g., memory 404 or computer data storage unit 412) having computer readable program code (e.g., program code of RMA 114) embodied or stored thereon.

Any combination of one or more computer readable medium(s) (e.g., memory 404 and computer data storage unit 412) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. In one embodiment, the computer readable storage medium is hardware. A non-exhaustive list of more specific examples of the computer readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program (e.g., program 114) for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code of RMA 114) embodied on a computer readable medium may be transmitted using any appropriate medium, including but not limited to wireless, wireline, optical fiber cable, RF, etc., or any suitable combination of the foregoing.

Computer program code (e.g., program code of RMA 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code of RMA 114). These computer program instructions may be provided to a processor (e.g., CPU 402) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 404 or computer data storage unit 412) that can direct a computer (e.g., computer system 102), other programmable data processing apparatus, or other devices to function in a particular manner, such that the instructions (e.g., program code of RMA 114) stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program code of RMA 114) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of detecting kernel-level rootkits by the RMA 114 built into operating system kernel 108 (see FIG. 1). Thus, an embodiment of the present invention discloses a process for supporting computer infrastructure, comprising integrating, hosting, maintaining and deploying computer-readable code (e.g., program code of RMA 114) into a computer system (e.g., computer system 102), wherein the code in combination with the computer system is capable of performing a process of detecting kernel-level rootkits by the RMA 114 built into operating system kernel 108 (see FIG. 1).

In another embodiment, the invention provides a business method that performs the process steps of the invention on a subscription, advertising and/or fee basis. That is, a service provider, such as a Solution Integrator, can offer to create, maintain, support, etc. a process of detecting kernel-level rootkits by the RMA 114 built into operating system kernel 108 (see FIG. 1). In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1, FIG. 3 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code of RMA 114), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of detecting a kernel-level rootkit, said method comprising the steps of:
   a computer system detecting a changed entry in a System Service Descriptor Table (SSDT) or an Interrupt Descriptor Table (IDT), wherein said changed entry results from an installation of suspect software in said computer system, said computer system having at least one processor and at least one memory;
   said computer system determining a value of said changed entry is not referenced by a white list;
   in response to the step of determining said value of said changed entry is not referenced by said white list, said computer system updating a black list to include a reference to said value of said changed entry to indicate that said value of said changed entry results from an installation of said kernel-level rootkit on said computer system;
   said computer system determining said suspect software is said kernel-level rootkit based on said value of said changed entry not being referenced by said white list; and
   in response to the step of updating said black list to include said reference to said value of said changed entry, said computer system restoring said changed entry to an entry of said SSDT or said IDT, said entry included in a first state of data structures of a kernel of an operating system of said computer system, said first state based on said SSDT and said IDT referencing hooks indicated in said white list which are not the result of any kernel-level rootkit being installed on said computer system.

2. The method of claim 1, further comprising:
   subsequent to the step of restoring said changed entry to said entry included in said first state, said computer system detecting a second changed entry in said SSDT or said IDT, wherein said second changed entry results from a second change to a second entry included in said first state of said SSDT and said IDT, said second change resulting from a second installation of second suspect software in said computer system;
   said computer system determining said black list references a second value of said second changed entry;
   said computer system identifying said second changed entry as being unauthorized based on said second value of said second changed entry being referenced by said black list;
   said computer system determining said second suspect software is a second kernel-level rootkit based on said detected second changed entry being identified as unauthorized; and
   responsive to said determining said second suspect software is said second kernel-level rootkit, said computer system restoring said second changed entry to said second entry included in said first state of said SSDT and said IDT.

3. The method of claim 1, further comprising said computer system preventing subsequent actions by said kernel-level rootkit based on said changed entry being restored to said entry included in said first state.

4. The method of claim 1, further comprising:
   said computer system storing said first state in a copy of said SSDT and said IDT;
   said computer system storing a first address and a first length of said SSDT and a second address and a second length of said IDT; and
   responsive to said detecting said changed entry, said computer system determining and storing a location of said changed entry based on said first address and said first length if said changed entry is included in said SSDT or based on said second address and said second length if said changed entry is included in said IDT,
   wherein said computer system restoring said changed entry to said entry included in said first state includes:
      said computer system locating said entry in said copy based on said location of said changed entry;
      subsequent to said locating said entry in said copy, said computer system retrieving said entry from said copy; and
      subsequent to said retrieving said entry from said copy, said computer system replacing said changed entry with said retrieved entry.

5. The method of claim 1, further comprising:
   said computer system monitoring said SSDT and said IDT periodically at predefined time intervals determined by a timer of said computer system; and
   subsequent to said determining said suspect software is said kernel-level rootkit, said computer system resetting said timer.

6. The method of claim 1, further comprising:
   prior to said detecting said changed entry, said computer system installing a corresponding call back function for said entry in said SSDT or said IDT; and
   said computer system executing said corresponding call back function in response to said entry being changed to said changed entry by said installation of said suspect software, wherein a result of said executing said corresponding call back function is said detecting said changed entry.

7. The method of claim 1, further comprising:
   providing at least one support service for at least one of creating, integrating, hosting, maintaining, and deploying computer-readable program code in said computer system, said program code being executed by a processor of said computer system which implements said detecting said changed entry, said determining said value of said changed entry is not referenced by said white list, said updating said black list, said determining said suspect software is said kernel-level rootkit, and said restoring said changed entry to said entry.

8. A computer system comprising:
a processor; and a computer-readable memory unit coupled to said processor, said memory unit containing instructions that are carried out by said processor to implement a method of detecting a kernel-level rootkit, said method comprising the steps of:
said computer system detecting a changed entry in a System Service Descriptor Table (SSDT) or an Interrupt Descriptor Table (IDT), wherein said changed entry results from an installation of suspect software in said computer system;
said computer system determining a value of said changed entry is not referenced by a white list;
in response to the step of determining said value of said changed entry is not referenced by said white list, said computer system updating a black list to include a reference to said value of said changed entry to indicate that said value of said changed entry results from an installation of said kernel-level rootkit on said computer system;
said computer system determining said suspect software is said kernel-level rootkit based on said value of said changed entry not being referenced by said white list; and
in response to the step of updating said black list to include said reference to said value of said changed entry, said computer system restoring said changed entry to an entry of said SSDT or said IDT, said entry included in a first state of data structures of a kernel of an operating system of said computer system, said first state based on said SSDT and said IDT referencing hooks indicated in said white list which are not the result of any kernel-level rootkit being installed on said computer system.

9. The computer system of claim 8, wherein said method further comprises:
subsequent to the step of restoring said changed entry to said entry included in said first state, said computer system detecting a second changed entry in said SSDT or said IDT, wherein said second changed entry results from a second change to a second entry included in said first state of said SSDT and said IDT, said second change resulting from a second installation of second suspect software in said computer system;
said computer system determining said black list references a second value of said second changed entry;
said computer system identifying said second changed entry as being unauthorized based on said second value of said second changed entry being referenced by said black list;
said computer system determining said second suspect software is a second kernel-level rootkit based on said detected second changed entry being identified as unauthorized; and
responsive to said determining said second suspect software is said second kernel-level rootkit, said computer system restoring said second changed entry to said second entry included in said first state of said SSDT and said IDT.

10. The computer system of claim 8, wherein said method further comprises said computer system preventing subsequent actions by said kernel-level rootkit based on said changed entry being restored to said entry included in said first state.

11. The computer system of claim 8, wherein said method further comprises:
said computer system storing said first state in a copy of said SSDT and said IDT;
said computer system storing a first address and a first length of said SSDT and a second address and a second length of said IDT; and
responsive to said detecting said changed entry, said computer system determining and storing a location of said changed entry based on said first address and said first length if said changed entry is included in said SSDT or based on said second address and said second length if said changed entry is included in said IDT,
wherein said computer system restoring said changed entry to said entry included in said first state includes:
said computer system locating said entry in said copy based on said location of said changed entry;
subsequent to said locating said entry in said copy, said computer system retrieving said entry from said copy; and
subsequent to said retrieving said entry from said copy, said computer system replacing said changed entry with said retrieved entry.

12. The computer system of claim 8, wherein said method further comprises:
said computer system monitoring said SSDT and said IDT periodically at predefined time intervals determined by a timer of said computer system; and
subsequent to said determining said suspect software is said kernel-level rootkit, said computer system resetting said timer.

13. The computer system of claim 8, wherein said method further comprises:
prior to said detecting said changed entry, said computer system installing a corresponding call back function for said entry in said SSDT or said IDT; and
said computer system executing said corresponding call back function in response to said entry being changed to said changed entry by said installation of said suspect software, wherein a result of said executing said corresponding call back function is said detecting said changed entry.

14. A computer program product, comprising:
a computer-readable, tangible storage device; and a computer-readable program code stored on the computer-readable, tangible storage device, said computer-readable program code containing instructions that are carried out by a processor of a computer system to implement a method of detecting a kernel-level rootkit, said method comprising the steps of:
said computer system detecting a changed entry in a System Service Descriptor Table (SSDT) or an Interrupt Descriptor Table (IDT), wherein said changed entry results from an installation of suspect software in said computer system;
said computer system determining a value of said changed entry is not referenced by a white list;
in response to the step of determining said value of said changed entry is not referenced by said white list, said computer system updating a black list to include a reference to said value of said changed entry to indicate that said value of said changed entry results from an installation of said kernel-level rootkit on said computer system;
said computer system determining said suspect software is said kernel-level rootkit based on said value of said changed entry not being referenced by said white list; and
in response to the step of updating said black list to include said reference to said value of said changed entry, said computer system restoring said changed entry to an entry of said SSDT or said IDT, said entry included in a first state of data structures of a kernel of an operating system of said computer system, said first state based on said SSDT and said IDT referencing hooks indicated in said white list which are not the result of any kernel-level rootkit being installed on said computer system.

15. The program product of claim 14, wherein said method further comprises:
subsequent to the step of restoring said changed entry to said entry included in said first state, said computer system detecting a second changed entry in said SSDT or said IDT, wherein said second changed entry results from a second change to a second entry included in said first state of said SSDT and said IDT, said second change resulting from a second installation of second suspect software in said computer system;
said computer system determining said black list references a second value of said second changed entry;
said computer system identifying said second changed entry as being unauthorized based on said second value of said second changed entry being referenced by said black list;
said computer system determining said second suspect software is a second kernel-level rootkit based on said detected second changed entry being identified as unauthorized; and
responsive to said determining said second suspect software is said second kernel-level rootkit, said computer system restoring said second changed entry to said second entry included in said first state of said SSDT and said IDT.

16. The program product of claim 14, wherein said method further comprises said computer system preventing subsequent actions by said kernel-level rootkit based on said changed entry being restored to said entry included in said first state.

17. The program product of claim 14, wherein said method further comprises:
said computer system storing said first state in a copy of said SSDT and said IDT;
said computer system storing a first address and a first length of said SSDT and a second address and a second length of said IDT; and
responsive to said detecting said changed entry, said computer system determining and storing a location of said changed entry based on said first address and said first length if said changed entry is included in said SSDT or based on said second address and said second length if said changed entry is included in said IDT,
wherein said computer system restoring said changed entry to said entry included in said first state includes:
said computer system locating said entry in said copy based on said location of said changed entry;
subsequent to said locating said entry in said copy, said computer system retrieving said entry from said copy; and
subsequent to said retrieving said entry from said copy, said computer system replacing said changed entry with said retrieved entry.

18. The program product of claim 14, wherein said method further comprises:
said computer system monitoring said SSDT and said IDT periodically at predefined time intervals determined by a timer of said computer system; and
subsequent to said determining said suspect software is said kernel-level rootkit, said computer system resetting said timer.

19. The program product of claim 14, wherein said method further comprises:
prior to said detecting said changed entry, said computer system installing a corresponding call back function for said entry in said SSDT or said IDT; and
said computer system executing said corresponding call back function in response to said entry being changed to said changed entry by said installation of said suspect software, wherein a result of said executing said corresponding call back function is said detecting said changed entry.

* * * * *